(12) United States Patent
Liew

(10) Patent No.: US 6,445,751 B1
(45) Date of Patent: Sep. 3, 2002

(54) ESTIMATION OF FREQUENCY OFFSET IN A COMMUNICATION SYSTEM

(75) Inventor: William J. Liew, Montville (CA)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/240,095

(22) Filed: Jan. 29, 1999

(51) Int. Cl.[7] .............................................. H04L 27/14
(52) U.S. Cl. ..................... 375/326; 375/323; 375/329; 375/334
(58) Field of Search ................................ 375/147, 149, 375/316, 322, 323, 329, 334, 326

(56) References Cited

U.S. PATENT DOCUMENTS

| | | | | |
|---|---|---|---|---|
| 5,710,792 A | * | 1/1998 | Fukawa et al. | 375/229 |
| 5,796,786 A | * | 8/1998 | Lee | 375/326 |
| 5,940,450 A | * | 8/1999 | Koslov et al. | 375/344 |
| 5,982,809 A | * | 11/1999 | Liu et al. | 375/206 |

* cited by examiner

Primary Examiner—Stephen Chin
Assistant Examiner—David B. Lugo
(74) Attorney, Agent, or Firm—Darby & Darby

(57) ABSTRACT

Frequency offset of a receiver employing frequency or phase shift keying is estimated by performing a pair-wise weighted summation of consecutive received training symbols, where each weighting factor is related to the ratio of the corresponding training symbols that were originally transmitted (known a priori). Specifically, the following sum is evaluated for the n symbol training sequence $(y_1, y_2, \ldots, y_n)$ which is received when the training sequence $(x_1, x_2, \ldots, x_n)$ is transmitted:

$$\sum_{k=2}^{n} y_k \cdot y_{k-1}^* \cdot a_k^* = g \cdot e^{j2\pi \Delta f T}$$

where g is a real constant and $\alpha_k$ is defined by $x_k = \alpha_k \cdot x_{k-1}$, $\alpha_k^*$ is the conjugate of $\alpha_k$, and T is the symbol period. Since the values of $x_k$ are predetermined, and $\alpha_k$ can be determined by dividing two of these values, the preceding sum is readily calculated and yields an estimate for $\Delta f$ by performing a single summation and placing the result in polar format.

9 Claims, 2 Drawing Sheets

ESTIMATION OF FREQUENCY OFFSET IN A COMMUNICATION SYSTEM

FIELD OF THE INVENTION

The present invention relates generally to communication systems and, more particularly, concerns the estimation of frequency offset in a communication system utilizing phase or frequency shift keying.

BACKGROUND OF THE INVENTION

In modern communication systems, information is transmitted over a channel in the form of a signal containing a sequence of symbols from a predefined symbol constellation. For example, in a system utilizing QPSK (quartenary phase shift keying) for signal "modulation", each symbol represents pairs of bits of a binary signal. Each symbol is represented as a pulse of carrier signal with one of four predefined phases (e.g. 0°, 90°, 180°, 270°). In DQPSK (differential quadrature phase shift keying), the change in carrier phase represents a pair of consecutive bits, rather than the actual value of phase. In the process of transmission, the communication channel alters the characteristics of the transmitted signal and, typically, adds random interference, commonly known as "noise." These modifications of a transmitted signal can make it difficult to recognize at a receiver the signal that was originally sent by the transmitter.

Modern communication systems, such as TDMA (time division multiple access) systems, seek to make more efficient use of frequency channels in digital cellular telephone systems. Typically, multiple time slots are assigned to each frequency channel, each telephone is assigned one or more specific time slots for transmission, and sends a packet of information during its assigned time slots. These packets of information are assembled by receiving equipment into the original voice components. In TDMA in the United States, each channel has six time slots, which are shared by three telephones, each telephone using two time slots.

TDMA communication systems commonly employ some form of phase shift keying. In such systems, the mobile units may exhibit a significant amount of frequency drift or variation in their local oscillators. An important part of receiving information properly in such a system is therefore resolving the frequency offset inherent in the received signal.

Such systems typically use training sequences, a predetermined sequence of symbols, to train or calibrate the receiver in its environment, before handling actual communications. For example, a predetermined sequence of n symbols $(x_1, x_2, \ldots, x_n)$ might be sent by the transmitter to train the receiver, with each symbol in the sequence being known in advance. QPSK and DQPSK signals are commonly generated by combining two orthogonal signals, for example, sine and cosine signals of the same frequency. Each symbol therefore conveniently is represented by a complex number, indicating the combination of two orthogonal components. For example, the $n^{th}$ symbol, $x_n$, might be represented as:

$$x_n = x_{n,r} + j x_{n,i}$$

Where $x_{n,r}$ and $x_{n,i}$ are the real and imaginary parts of $x_n$, respectively, and j, by definition, is $\sqrt{-1}$. A symbol may also be represented in polar form as $x_n = X_n e^{j\Phi_n}$, where $X_n$ is the amplitude of the symbol and $\Phi_n$ is its phase.

Although a symbol sequence $(x_1, x_2, \ldots, x_n)$ is transmitted, the receiver receives the symbol sequence $(y_1, y_2, \ldots, y_n)$, in which the $k^{th}$ symbol, $y_k$, is given by:

$$y_k = c_k \cdot x_k + n_k$$

where $n_k$ is the noise introduced by the channel, $y_k$ and $c_k$, like $x_k$, are complex numbers, with $c_k$ characterizing the effect of the transmission channel on $x_k$. $c_k$ can be represented, in polar form, as:

$$c_k = A_k \cdot e^{j\phi_k} \cdot e^{j2\pi k T \Delta f}$$

where $A_k$ and $\phi_k$ are relatively constant amplitude and phase changes introduced by the communication channel, k is the symbol's time position, T is the symbol period, and $\Delta f$ is the frequency offset, which is sought to be estimated by the present invention.

At present, $\Delta f$ is typically estimated through a trial and error technique. For example, if the training sequence had fourteen symbols, the conventional method would evaluate the following equation:

$$\sum_{k=1}^{14} y_k \cdot x_k^* \cdot e^{-j 2\pi \Delta f k T}$$

for each of a plurality of "guesses" for $\Delta f$, where $x_k^*$ is the conjugate of $x_k$. That is, if $x_k = X_k \cdot e^{j\theta}$, then $x_k^* = x_k \cdot e^{-j\theta}$, or if $x_k = x_{k,r} + j x_{k,i}$, then $x_k^* = x_{k,r} - j x_{k,i}$.

One might, for example, take seven guesses for $\Delta f$, such as: −600, −400, −200, 0, 200, 400 and 600 Hertz, and evaluate the above sum using each value. The estimate for $\Delta f$ is then that value that yields the largest value for the sum. This approach has two major shortcomings: it requires the evaluation of the sum many times and can only be as accurate as the guesses. Thus, if one wanted a better estimate, more and more closely spaced guesses should be used, which requires more processing time.

It will therefore be appreciated that a process for estimating $\Delta f$ which does not require multiple evaluations or guesses would be highly desirable. Similarly, it would be desirable for the accuracy of the estimate not to depend so critically on the number of evaluations.

SUMMARY OF THE INVENTION

In accordance with the present invention, $\Delta f$ is estimated by performing a pairwise weighted summation of consecutive received training symbols, where each weighting factor is related to the ratio of the corresponding training symbols that were originally transmitted. Preferably, the following sum is evaluated for the n symbol training sequence discussed above:

$$\sum_{k=2}^{n} y_k \cdot y_{k-1}^* \cdot a_k^* = g \cdot e^{j 2\pi \Delta f T}$$

where g is a real constant and $\alpha_k$ is defined by:

$$x_k = \alpha_k \cdot x_{k-1}$$

and $\alpha_k^*$ is the conjugate of $\alpha_k$. Since the values of $x_k$ are predetermined, and $\alpha_k$ can be determined by dividing two of these values, the preceding sum is readily calculated and yields an estimate for $\Delta f$ by performing a single summation and placing the result in polar format. By way of comparison, practical implementations of the prior art are able to estimate frequency offset with an accuracy of about 200 Hz, with a variation range of 600 Hz, while the present invention can estimate an accuracy 50 Hz in variation range of 4,000 Hz.

BRIEF DESCRIPTION OF THE DRAWINGS

The foregoing brief description as well as further objects, features and advantages of the present invention would be understood more completely from the following detailed description of a presently preferred, but nonetheless illustrative, embodiment, with reference being had to the accompanying drawings in which.

DETAILED DESCRIPTION OF THE PREFERRED EMBODIMENTS

The preferred embodiment of the invention is disclosed in a TDMA (time division multiple access) system utilizing DQPSK (differential quadrature phase shift keying). However, those skilled in the art will appreciate that the present invention is equally applicable to many other types of systems, including CDMA systems, and any type of phase or frequency keying. Prior to actual communication, the frequency offset, $\Delta f$, is estimated by transmitting an n symbol training sequence $(x_1, x_2, \ldots, x_n)$, in which each symbol is represented as a complex number, as explained above. As also explained above, owing to the effect of the communication channel, the receiver actually receives the symbol sequence $(y_1, y_2, \ldots, y_n)$. defined above. In order to estimate the frequency offset, the sum defined by equation 1 is performed for the n symbol sequence $(y_1, y_2, \ldots y_n)$.

$$\sum_{k=2}^{n} y_k \cdot y_{k-1}^* \cdot a_k^* = g \cdot e^{j2\pi \Delta f T} \quad (1)$$

where g is a real constant and $\alpha_k$, defined by $x_k = \alpha_k \cdot x_{k-1}$, is essentially the ratio between two consecutive training symbols, $\alpha_k^*$ is the conjugate of $\alpha_k$, and T is the symbol period. Once the summation in equation 1 is performed and the result placed in polar form, the frequency offset is readily evaluated from the phase portion of the complex number representing the sum.

Figure 1:
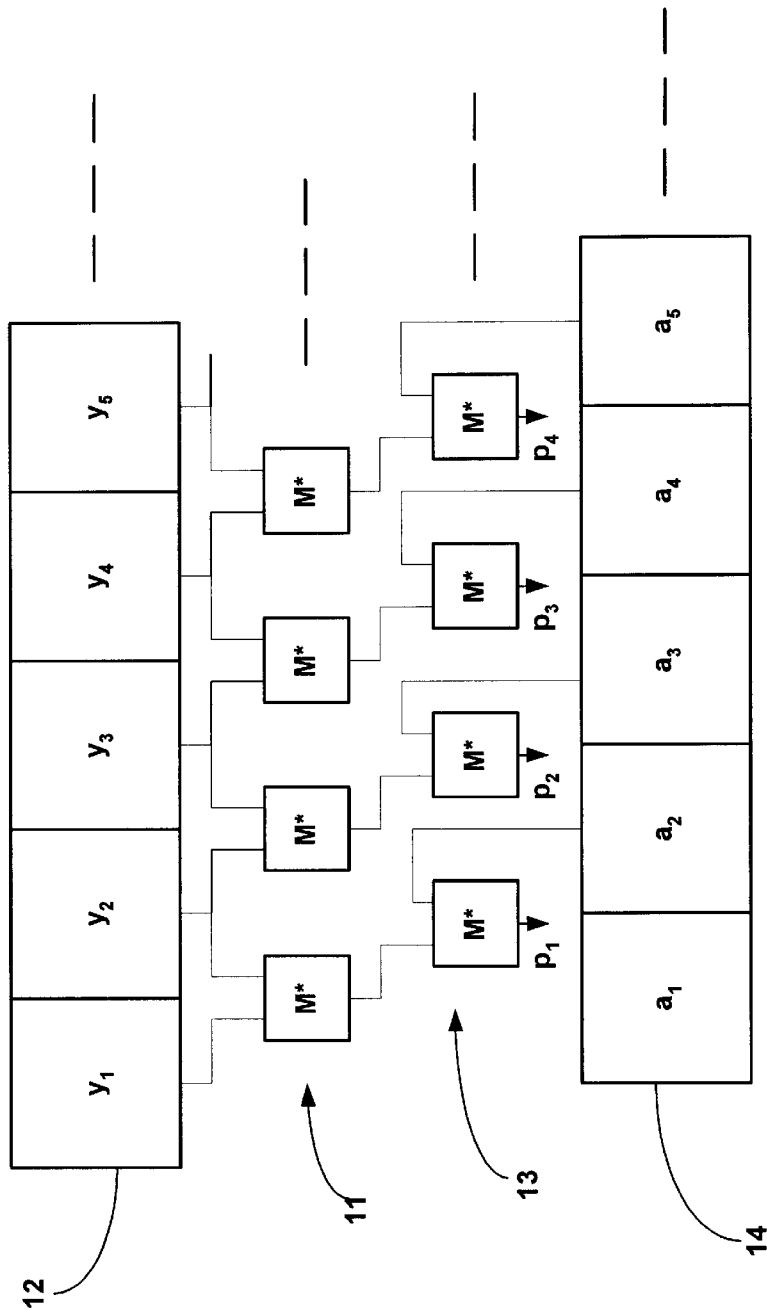
FIG. 1 is a functional block diagram illustrating frequency offset estimation in accordance with the present invention.
Figure 1:
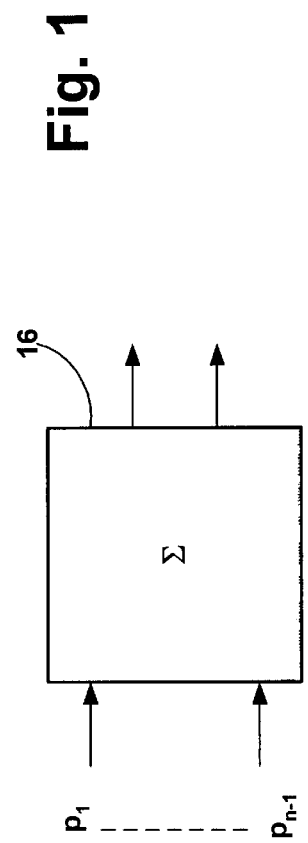

It will be appreciated that the sum being evaluated is merely a weighted sum of products of consecutive pairs of received symbols, and the FIG. 1 is a schematic block diagram illustrating how the summation of equation 1 would be performed. The weighting factors $(a_2, a_3, \ldots, a_n)$ are computed in advance and stored in memory 14. It should be recalled that each weighting factor is a complex number and, therefore, is stored as two consecutive quantities, representing the real and imaginary parts. The received training symbols $(y_1, y_2, \ldots, y_n)$ are stored in a memory 12. Since each symbol is, similarly, a complex quantity, it will also require two consecutive storage locations. It will be appreciated that memories 12 and 14 can be part of one large storage system. Pairs of consecutive received symbols are applied as inputs to a first level 11 of conjugate multipliers M*. The output of each first level conjugate multiplier is applied as an input to a second level 13 conjugate multiplier M*, along with a respective weighting factor. The second level 13 of multipliers then produces a set of complex products $(p_1, p_2, \ldots, p_{n-1})$ These complex products are then added in a summation unit 16 to produce the summation of equation 1. In order to derive $\Delta f$, the summation result is placed in polar form. If the summation result is expressed as a complex number $S = S_r + jS_i$, then the phase of S in polar format would be equal to $\tan^{-1}(S_i/S_r)$, and $\Delta f$ can then be determined directly.

Figure 2:
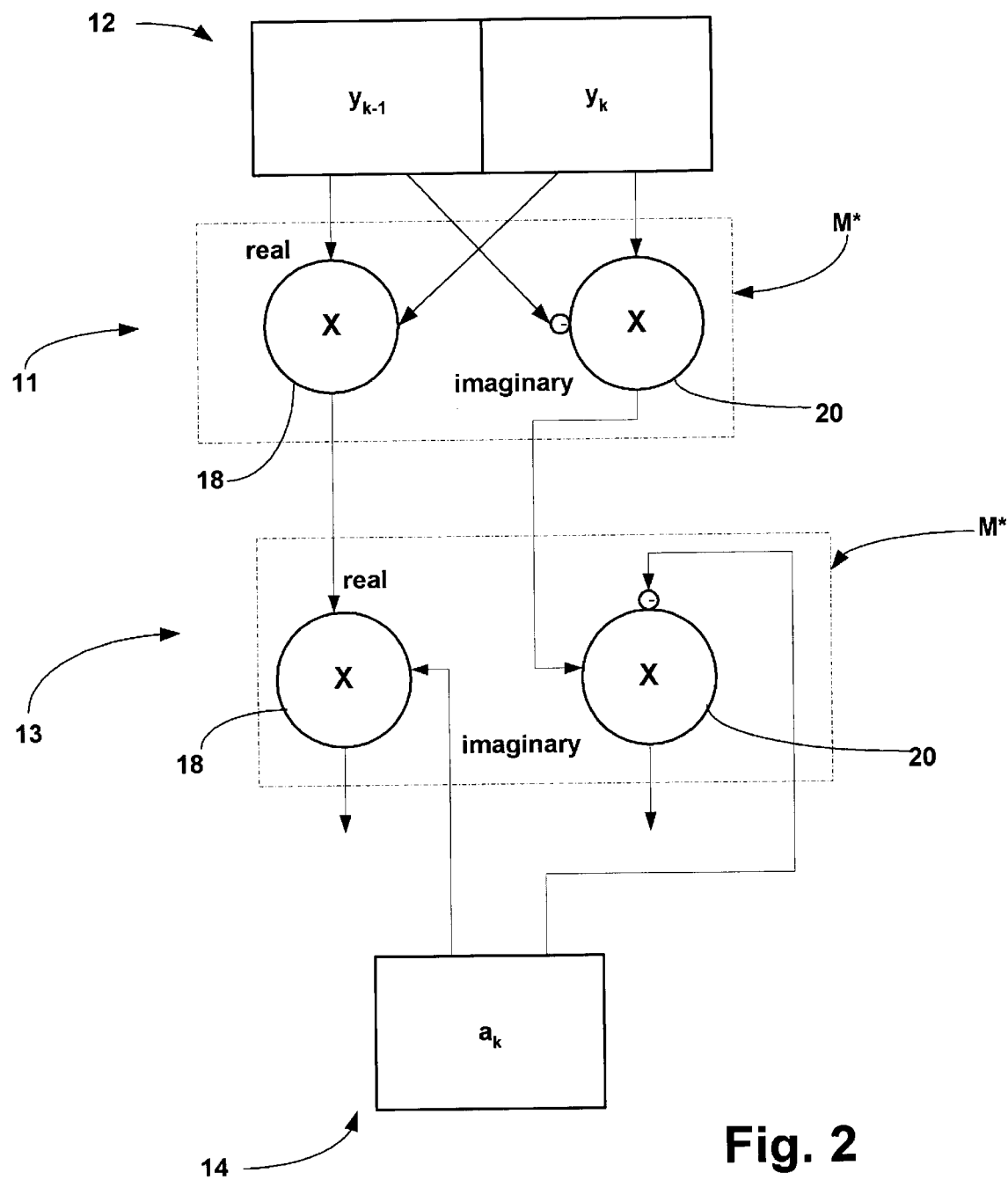
FIG. 2 is a functional block diagram illustrating certain details of functional blocks appearing in FIG. 1.

FIG. 2 illustrates the details of the $k^{th}$ stage in the functional block diagram of FIG. 1. Initially, it should be noted that each conjugate multiplier M* is composed of a multiplier 18 and a multiplier 20. The multiplier 18 receives the real portions of the two complex quantities being multiplied, and the multiplier 20 receives the imaginary portions of the corresponding quantities, with the quantity represented as a conjugate having its sign reversed (indicated by a small circle). In the $k^{th}$ stage, the real portions of $y_k$ and $y_{k-1}$ are multiplied in the multiplier 18 of the first level 11 conjugate multiplier M*. The real part of the resulting product is then multiplied with the real part of $a_k$ in the multiplier 18 of the second level 13 conjugate multiplier M* to produce the real part, $p_{k-1}$, of product $p_{k-1}$. The imaginary portion of $a_k$ is reversed in sign and, in multiplier 20 of the second level 13 conjugate multiplier M*, is multiplied by the imaginary portion of the output of multiplier 20 of the first level 11 conjugate multiplier M*. The resulting quantity is applied as an input to the multiplier 20 in the second level 13 conjugate multiplier M*, which receives the imaginary portion of $a_k$, with a sign inversion, at its other input. The resulting output of multiplex 20 is then the imaginary portion $p_{k-1,i}$ portion of the product $p_{k-1}$.

In many applications, the communications device in which the process of the present invention is performed will include a processor, such as digital signal processor (DSP), and that processor can be used effectively to perform the process. A DSP of the dual MAC type, such as the DSP16000, available from Lucent Technologies, would be particularly efficient in performing the multiplication and summation steps of equation (1).

Although a preferred embodiment of the invention has been disclosed, for illustrative purposes, those skilled in the art will appreciate that many additions, modifications and substitutions are possible, without departing from the scope and spirit of the invention as defined by the accompanying claims.

What is claimed:

1. In a method for estimating the frequency offset of a receiver in a communication system utilizing one of phase shift keying and frequency shift keying, said system being of the type utilizing a predetermined n symbol training sequence for receiver calibration purposes, before communication of actual information, the receiver receiving an n symbol sequence corresponding to the training sequence, said method comprising the step of forming a weighted sum of pair-wise products of consecutive received symbols, wherein the weighting factor of a product is related to the ratio of the corresponding pair of training symbols.

2. The method of claim 1, wherein the sequence of training symbols is $(x_1, x_2, \ldots, x_n)$ and the sequence of received symbols is $(y_1, y_2, \ldots, y_n)$, the following summation being performed on the received symbol sequence:

$$\sum_{k=2}^{n} y_k \cdot y_{k-1}^* \cdot a_k^*$$

where $\alpha_k$ is defined by $x_k = \alpha_k \cdot x_{k-1}$ and $\alpha_k^*$ is the conjugate of $\alpha_k$.

3. The method of claim 2, wherein the result of the summation is a complex number, is expressed in polar form, and the estimate of frequency offset is derived from the phase portion of the value of the summation.

4. The method of claim 3, wherein the frequency offset $\Delta f$ is derived in accordance with the following equation:

$$\sum_{k=2}^{n} y_k \cdot y_{k-1}^* \cdot a_k^* = g \cdot e^{j2\pi\Delta fT}$$

where g is a real constant and T is the symbol period.

5. The method of claim 1, wherein the result of the summation is a complex number, is expressed in polar form, and the estimate of frequency offset is derived from the phase portion of the value of the summation.

6. In an apparatus for estimating the frequency offset of a receiver in a communication system utilizing one of phase shift keying and frequency shift keying, said system being of the type utilizing a predetermined n symbol training sequence for receiver calibration purposes before communication of actual information, the receiver receiving an n symbol sequence corresponding to the training sequence, said apparatus comprising:
  a plurality of multipliers generating pair-wise products of consecutive received symbols;
  a combiner forming a weighted sum of said pair-wise products, the combiner producing a weighting factor for a product which is related to the ratio of the corresponding pair of training symbols.

7. The apparatus of claim 6, wherein the training sequence is $(x_1, x_2, \ldots, x_n)$, the sequence of received symbols is $(y_1, y_2, \ldots, y_n)$, and a multiplier produces the product $y_k \cdot y^*_{k-1}$, where $y_{k-1}$ and $y_k$ are two consecutive received symbols and $y^*_{k-1}$ is the conjugate of $y_{k-1}$, the summer performing the following weighted summation:

$$\sum_{k=2}^{n} y_k \cdot y_{k-1}^* \cdot a_k^*$$

where $\alpha_k$ is defined by $x_k = \alpha_k \cdot x_{k-1}$ and $\alpha_k^*$ is the conjugate of $\alpha_k$.

8. The apparatus of claim 7, wherein the result of the summation is a complex number, the apparatus further comprising a converter producing a signal representing the weighted sum in polar form, the estimate of frequency offset being derived from the phase portion of the polar form representation.

9. The apparatus of claim 6, wherein the result of the summation is a complex number, the apparatus further comprising a converter producing a signal representing the weighted sum in polar form, the estimate of frequency offset being derived from the phase portion of the polar form representation.

* * * * *